No. 679,694. Patented July 30, 1901.
G. H. ELLIS.
MANUFACTURE OF TWINE FROM UNRETTED FLAX STRAWS.
(Application filed Nov. 10, 1900.)
(No Model.)
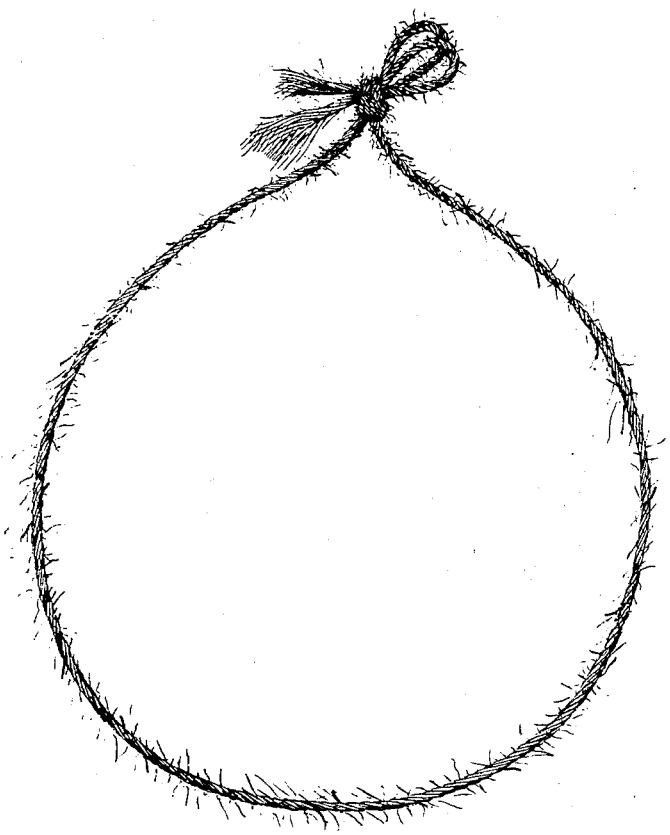
WITNESSES: INVENTOR.
Chas. N. Chambers. George H. Ellis,
Thomas B. McGregor. BY Banning & Banning,
ATTORNEYS.

UNITED STATES PATENT OFFICE.

GEORGE H. ELLIS, OF CHICAGO, ILLINOIS, ASSIGNOR, BY MESNE ASSIGNMENTS, TO WILLIAM DEERING, OF EVANSTON, ILLINOIS.

MANUFACTURE OF TWINE FROM UNRETTED FLAX-STRAWS.

SPECIFICATION forming part of Letters Patent No. 679,694, dated July 30, 1901.

Application filed November 10, 1900. Serial No. 36,012. (No specimens.)

*To all whom it may concern:*

Be it known that I, GEORGE H. ELLIS, a citizen of the United States, residing in Chicago, in the county of Cook and State of Illinois, have invented a new and useful Article of Manufacture, Consisting of a Twine Formed of Unretted Flax-Straws, of which the following is a specification.

The object of the invention is to supply the demand for a cheap twine for binding grain or for other purposes where durability for any great length of time is not an important consideration.

My twine is composed of the cortices of flax-straw twisted into a twine which may have a single or multiple strand.

In the process of manufacture the woody portions of the unretted flax-straws are broken sufficiently to permit the cortices to be twisted, during which process and the subsequent twisting, although the flax is wholly unretted, a sufficient part of the hurds are shaken out. In this process I omit all carding and hackling of the cortices, thus leaving them as long as possible, which in the case of seed-flax will be of substantially the length of the straws and in the case of varieties of flax grown of excessive length are not injuriously shortened. Wisps of these unhackled cortices are interlapped and twisted together. The incidental removal of the hurds, wholly or in part, reduces the size of the twine somewhat, with the result that a twine having sufficient strength for the purpose of binding grain is small enough to be perfectly handled by the knotting devices of a self-binder. In order to render this twine more suitable for binding grain, I apply oil to it, and to prevent the twine from being eaten by insects I protect it by applying coal-tar or other substances. The most suitable lubricant is a crude oil known as "degras," and this I sometimes apply. As the prevention of decomposition is not a matter of great importance, because of the mere temporary use for which the twine is intended, the necessity of retting does not exist; but I find that when treated with crude oil the twine is rendered more nearly proof against decomposition.

Primarily, then, my twine consists in unretted flax-straws having their woody portion broken and preferably the latter partially or wholly removed and the remaining cortices unhackled, interlapped, and twisted to form a single or multiple strand twine.

I form the twine into balls or wind it on spools for use, as desired.

The invention is illustrated in the accompanying drawing in so far as a drawing can illustrate it, where the figure represents a band as if removed from a bundle of grain, having the two ends tied, as is customary in grain-binding.

What I claim as my invention, and desire to secure by Letters Patent, is—

A twine of flax-straw, the same composed of wisps of interlapped, unhackled cortices of substantially the full length of the straw, twisted together.

GEORGE H. ELLIS.

Witnesses:
THOMAS A. BANNING,
THOMAS B. MCGREGOR.